United States Patent [19]

Clegg

[11] Patent Number: 4,621,907
[45] Date of Patent: Nov. 11, 1986

[54] CONICAL BEAM CONCENTRATOR

[76] Inventor: John E. Clegg, 2320 Keystone Dr., Orlando, Fla. 32806

[21] Appl. No.: 657,928

[22] Filed: Oct. 5, 1984

[51] Int. Cl.⁴ ............................................. G02B 13/18
[52] U.S. Cl. ................................................... 350/432
[58] Field of Search .................................. 350/432–435

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

Primary Examiner—John K. Corbin
Assistant Examiner—Scott J. Sugarman

[57] ABSTRACT

An upper component lens which transmits and refracts a circular whole incipient beam into a lower component lens which transmits and refracts the beam, forming a divergent lateral beam in the horizontal plane.

The beam concentrator is to be used as the lower stage of a pipe cutter.

1 Claim, 2 Drawing Figures

CONICAL BEAM CONCENTRATOR

BACKGROUND

The code designation of the concentrator is TTRT-RT:C (T—transmitting section of a component lens, R—refracting section of a component lens, and C—concentrating stage lens).

Prior art is limited to beam concentrators which emit concentrated whole or annular beams parallel to the vertical optic axis of the lenses.

The upper component lens of this beam concentrator is used extensively in other beam concentrators by this inventor.

DRAWINGS

DESCRIPTION

Figure 1:
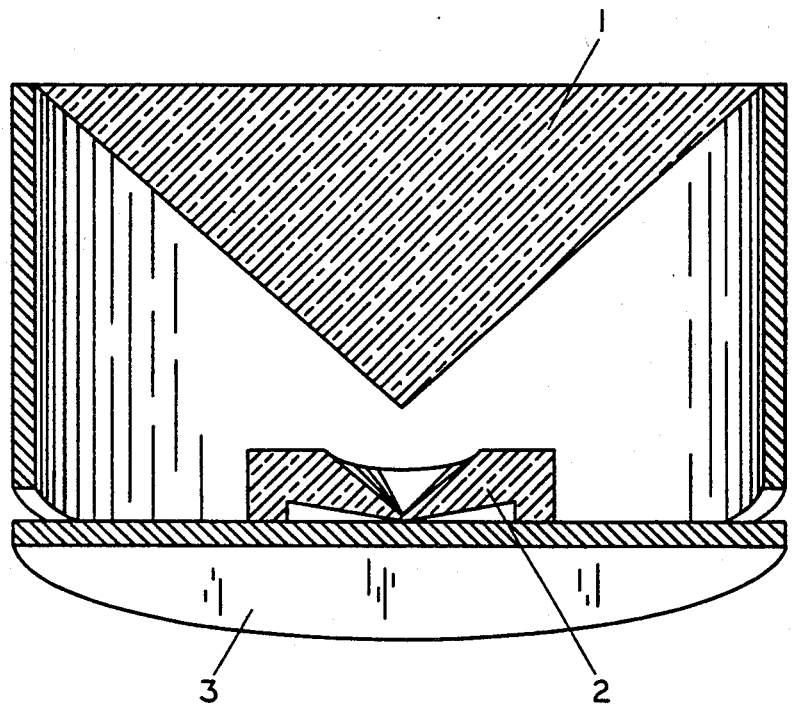
FIG. 1 is an elevation of the conical beam concentrator with the lenses shown in section.

FIG. 1 shows the conical beam concentrator TTRT-RT:C with upper component lens RT 1 mounted above lower component lens TTRT 2 inside casing 3.

Figure 2:
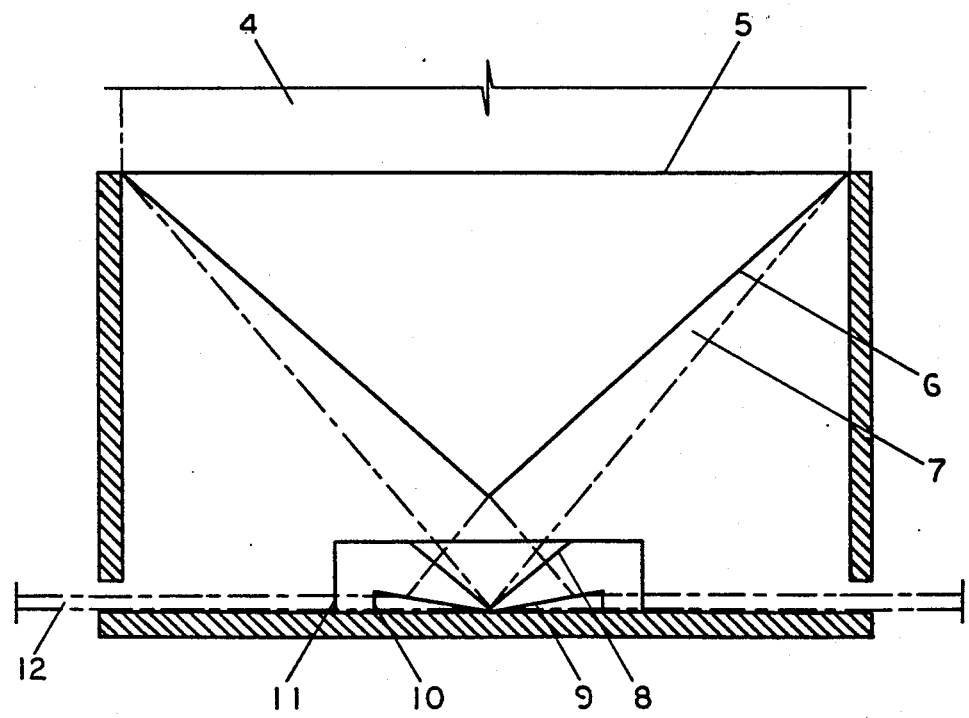
FIG. 2 is an elevation of the beam concentrator with a ray diagram.

FIG. 2 shows the conical beam concentrator with a ray diagram. Circular whole incipient beam 4 is transmitted by planar section 5 and refracted by convex conical section 6, forming convergent conical beam 7.

Beam 7 is transmitted by concave conical section 8, refracted by convex conical section 9 and transmitted by cylindrical sections 10 and 11, forming divergent lateral beam 12 which is emitted in the horizontal plane.

I claim:

1. A conical beam concentrator TTRT-RT:C comprising an upper component lens RT (1) having a planar section (5) which receives and transmits a circular whole incipient beam (4), and having a convex conical section (6) which refracts incipient beam (4), forming convergent conical beam (7); and comprising a lower component lens TTRT (2) mounted below upper component lens RT (1) and having a concave conical section (8) which transmits convergent conical beam (7), having a convex conical section (9) which refracts convergent conical beam (7), forming concentrated divergent lateral beam (12), and having two cylindrical sections (10,11) which emit the concentrated divergent lateral beam (12) in the horizontal plane.

* * * * *